J. F. Boynton.
Carburetor.
No. 2,376. Reissued Oct. 16, 1866.
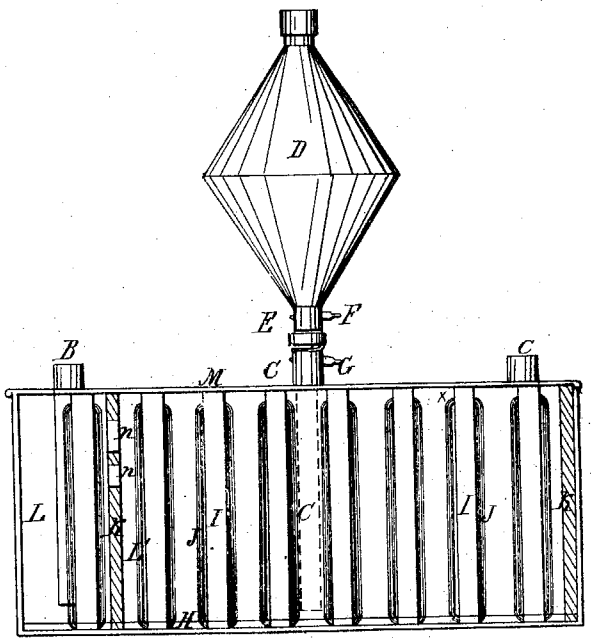
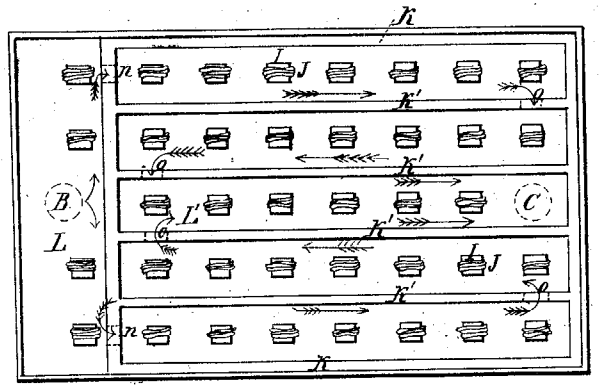
Witnesses
J. J. Coombs
Jos L Coombs
Inventor
John F. Boynton.

UNITED STATES PATENT OFFICE.

JOHN F. BOYNTON, OF SYRACUSE, NEW YORK.

IMPROVED APPARATUS FOR CARBURETING GAS.

Specification forming part of Letters Patent No. 58,209, dated September 25, 1866; Re-issue No. 2,376, dated October 16, 1866.

*To all whom it may concern:*

Be it known that I, JOHN F. BOYNTON, of Syracuse, in the county of Onondaga and State of New York, have invented certain new and useful Improvements in Apparatus for Carbureting Gas and Air; and I do hereby declare that the following is a full, clear, and exact description thereof, reference being had to the accompanying drawings, and to the letters of reference marked thereon.

It is well known that illuminating-gas standing a long time over cold water, or conveyed a long distance through cold pipes, will have much of its illuminating properties condensed or lost; and it is believed that the illuminating qualities of gas are hydrocarbons, such as benzole and toluole, held in suspension by hydrogen and other gases, and that these elements are precipitated into the gas-mains of the city and may be found with the water at the water-traps of the street-mains, instead of being carried forward into the houses and other places of consumption, so that however perfect the gas may have been manufactured at the works, it will become deprived of a large portion of its value before it reaches the consumer.

The object of my invention is to restore to the gas its illuminating properties by thoroughly commingling the compound vapors of hydrocarbons with depreciated gases, and also to carbonize common air, so as to make it a substitute for illuminating-gas.

To enable others skilled in the art to make and use my invention, I will proceed to describe the construction and operation of my improved apparatus.

In a former patent for an apparatus, upon which my present invention is an improvement, I have called the apparatus a "gas-light multiplier."

In the accompanying drawings, Figure 1 is a top view of my carbureting-box, with the cover removed to show its internal structure. Fig. 2 is a vertical longitudinal section of the same.

A A is the outer wall of the box, B the induction-pipe for gas or air, and C the exit for the same. D is a magazine for holding the hydrocarbon liquid, from which it is automatically fed to the box; E, the tube for conveying the same into the box, and F G cocks in said tube. H is a base-board in the bottom of the box, with numerous perforations, into which wooden pegs I I, supporting cotton-wicking J J, or other fibrous material, are inserted. K K is a wooden box, open at the bottom and top, sitting within the main box, and having longitudinal partitions K′ dividing it into several compartments. This internal box is movable, and when in place rests upon the base-board H and divides the vapor-chamber into several compartments. After the gas enters the outer box through the induction-pipe B, it will pass into the internal box K, through openings or notches *n* in the end wall thereof, and take the directions shown by the arrows through the several compartments to the exit-pipe C, passing from one compartment to another through openings or notches *o* in the partition-walls. The gas is thus compelled to perform a circuit in passing through the box, and is brought in contact with the wooden pegs and fibrous material in each compartment. The wooden pegs serve the double purpose of supporting the cotton-wicking or other fibrous material J J, and of assisting in carrying on the capillary action required to bring the liquid hydrocarbon to the upper portion of the box and expose it to evaporation.

Each of the wooden pegs has an open slot, X, in its upper end for receiving and retaining the cotton-wicking, which is wound around the peg lengthwise, as clearly shown in the drawings. The pegs may be sawed or split in a square form, and the holes in the base-board H may be round, as the cotton-wicking on the peg will cause it to fit tightly and firmly to the base-board, notwithstanding the difference in form between the peg and the hole into which it is driven.

D, the magazine of the automatic filler, is a vessel to be filled with the carbonizing fluid, and having a plug, *d*, closing it air-tight at the top, and at its bottom or tubular portion a cock, F, which may be opened and closed at pleasure. This tubular portion of the magazine is screwed onto the tube C, which extends nearly to the bottom of the carbureting-box, as shown by dotted lines in Fig. 2.

G is a cock in the upper end of tube C, to prevent the escape of gas when the magazine is removed for filling or other purposes. To supply the magazine it is only necessary to close the cock F, remove the plug *d*, and introduce the liquid through a funnel. After replacing the plug *d* the cocks F and G are opened, and the liquid will pass down the tube C from the magazine, being displaced by the ascending gas, until the box is filled sufficiently to close the mouth of the tube C, when no more can escape until the gas has absorbed a sufficient quantity in the box to free the mouth of the tube C, thereby allowing another portion of the gas to ascend into the magazine, displacing more liquid.

L and L′ are outer and inner chambers, formed by the internal box K not extending the whole length of the main or outer box. M is a condensing and absorbing plate, covered with fibrous material resting upon and over the partitions and pegs.

The wooden pegs and the cotton-wicking supported thereby being both powerful capillary agents, produce a compound capillary action to bring the liquid hydrocarbon to the upper portion of the box, where, being diffused over a large surface, it is rapidly evaporated, and the gas, in passing through the box, becomes thoroughly charged with the enriching vapors produced by such evaporation.

Having thus fully described my invention, what I claim as new, and desire to secure by Letters Patent, is—

1. The automatic filling-reservoir D, in combination with the tube C, substantially as described.

2. The base-board H, in combination with a series of wooden pegs inserted therein, and supporting fibrous material, to produce a compound capillary action, as and for the purposes described.

3. The wooden pegs I, wound with cotton-wicking J, or other equivalent fibrous material, to produce a compound capillary action, as described.

4. The base-board H, wooden pegs I, and cotton-wicking or other fibrous material J, so combined, constructed, and put together as to form a movable frame or cage, which may be inserted into the carbureting-box and removed therefrom together as one entire structure.

5. Securing the fibrous material at the lower end of the peg by driving it with the peg into a perforation of the base-board, substantially as described.

6. The internal box K, with its partitions K′, constructed and arranged substantially as described.

7. So constructing and arranging said internal box K that when set in the main carbureting-box it will divide the carbureting-chamber into an outer and inner apartment, substantially as described.

8. Constructing said box K, with its partition-walls, of wood or any other porous substance which will produce capillary action.

JOHN F. BOYNTON.

Witnesses:
J. J. COOMBS,
JOS. L. COOMBS.